United States Patent
Jiang et al.

(10) Patent No.: US 11,909,300 B2
(45) Date of Patent: Feb. 20, 2024

(54) SWITCH-MODE POWER SUPPLY (SMPS) CONTROLLER, SMPS SYSTEM AND POWER SUPPLY METHOD FOR SMPS SYSTEM

(71) Applicant: SHANGHAI BRIGHT POWER SEMICONDUCTOR CO., LTD., Shanghai (CN)

(72) Inventors: Rulong Jiang, Shanghai (CN); Liqiang Hu, Shanghai (CN); Shungen Sun, Shanghai (CN); Zhen Zhu, Shanghai (CN); Xiaoru Gao, Shanghai (CN); Yihui Chen, Shanghai (CN); Hong Zhang, Shanghai (CN); Pengfei Lu, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 92 days.

(21) Appl. No.: 17/339,748

(22) Filed: Jun. 4, 2021

(65) Prior Publication Data
US 2021/0384832 A1 Dec. 9, 2021

(30) Foreign Application Priority Data
Jun. 5, 2020 (CN) .......................... 202010506989.9

(51) Int. Cl.
*H02M 1/00* (2006.01)
*H02M 3/156* (2006.01)
*H02M 1/36* (2007.01)

(52) U.S. Cl.
CPC ......... *H02M 1/0006* (2021.05); *H02M 3/156* (2013.01); *H02M 1/0048* (2021.05); *H02M 1/36* (2013.01)

(58) Field of Classification Search
CPC .... H02M 3/156; H02M 3/158; H02M 1/0006; H02M 1/36; H02M 1/08; H02M 1/0048
See application file for complete search history.

(56) References Cited

U.S. PATENT DOCUMENTS 5,757,627 A * 5/1998 Faulk ................ H02M 3/33576
363/21.16
5,982,640 A * 11/1999 Naveed ............. H02M 3/33523
363/21.16

(Continued)

FOREIGN PATENT DOCUMENTS

CN 101562394 A 10/2009
CN 104124878 A * 10/2014

(Continued)

*Primary Examiner* — Gustavo A Rosario-Benitez
(74) *Attorney, Agent, or Firm* — Muncy, Geissler, Olds & Lowe, P.C.

(57) ABSTRACT

A switch-mode power supply (SMPS), an SMPS system and a power supply method for an SMPS system are disclosed. The SMPS controller includes an output-voltage power supply unit, a built-in energy storage unit and a logic control unit. The output-voltage power supply unit is configured to charge the built-in energy storage unit using an output voltage from the SMPS system so that the built-in energy storage unit can provide an operating voltage for the logic control unit. The use of a stand-off energy storage capacitor can be dispensed with, and the use of the output voltage as a power supply is enabled. As a result, significant reductions in overall and standby power dissipation are achieved. In addition, the SMPS controller may further include a high-voltage power supply unit, which provides a hybrid power supply solution, together with the output-voltage power supply unit.

19 Claims, 9 Drawing Sheets

(56) References Cited

U.S. PATENT DOCUMENTS

| | | | | |
|---|---|---|---|---|
| 8,129,959 B1* | 3/2012 | Balogh | .................... | H02M 1/36 |
| | | | | 323/222 |
| 2007/0058398 A1* | 3/2007 | Yang | ................. | H02M 3/33507 |
| | | | | 363/16 |
| 2009/0302816 A1* | 12/2009 | Kunimatsu | ........... | H02M 3/156 |
| | | | | 323/282 |
| 2010/0002480 A1* | 1/2010 | Huynh | ................... | H02M 3/335 |
| | | | | 363/90 |
| 2013/0033110 A1* | 2/2013 | Sun | ......................... | H02M 1/36 |
| | | | | 307/64 |
| 2013/0077353 A1* | 3/2013 | Kuang | ............... | H05B 45/3725 |
| | | | | 363/20 |
| 2014/0056040 A1* | 2/2014 | Larosa | ................ | H02M 3/33507 |
| | | | | 363/49 |
| 2016/0149484 A1* | 5/2016 | Wu | ......................... | H02M 3/07 |
| | | | | 363/21.12 |
| 2017/0187275 A1* | 6/2017 | Lin | ......................... | H02M 1/36 |
| 2019/0339728 A1* | 11/2019 | Nabeto | ................. | H02M 3/158 |
| 2019/0348917 A1* | 11/2019 | Lee | ........................... | G05F 1/56 |
| 2020/0052578 A1* | 2/2020 | Liu | ........................ | H02M 1/36 |
| 2020/0127571 A1 | 4/2020 | Matsuda et al. | | |
| 2020/0401173 A1* | 12/2020 | Naji | ................. | H02M 3/33523 |

FOREIGN PATENT DOCUMENTS

| | | | | |
|---|---|---|---|---|
| CN | 105870896 A | * | 8/2016 | ............... H02H 9/02 |
| CN | 205566097 U | | 9/2016 | |
| CN | 206432888 U | | 8/2017 | |
| CN | 108809101 A | | 11/2018 | |
| CN | 108923631 A | | 11/2018 | |

* cited by examiner

SWITCH-MODE POWER SUPPLY (SMPS) CONTROLLER, SMPS SYSTEM AND POWER SUPPLY METHOD FOR SMPS SYSTEM

CROSS-REFERENCES TO RELATED APPLICATION

This application claims the priority of Chinese patent application number 202010506989.9, filed on Jun. 5, 2020, the entire contents of which are incorporated herein by reference.

TECHNICAL FIELD

The present invention relates to switch-mode power supplies (SMPS) and, in particular, to an SMPS controller, an SMPS system and a power supply method for an SMPS system.

BACKGROUND

High-side buck AC/DC switch-mode power supply (SMPS) systems are widely used in home appliances, electric meters and many other applications. Scientific and technological advances are resulting in growing demand in the art for products with better performance, e.g., higher efficiency, lower standby power dissipation, better EMI shielding, increased flexibility of use and lower cost.

FIG. 1 shows a common conventional high-side buck AC/DC SMPS system. An AC voltage from the grid is rectified by a rectifier bridge consisting of diodes D1, D2, D3, D4 and processed and output by a control chip U0 as an constant output voltage DC OUT for powering a downstream load. During steady operation of the SMPS system, an operating voltage (i.e., a power supply voltage) VCC of the control chip U0 is provided by the output voltage DC OUT that has passed through a diode D6 and a capacitor C3 for sampling VCC. The VCC-sampling capacitor C3 is configured to accomplish the sampling of the output voltage DC OUT and provide a power supply to the control chip U0. In other words, the control chip U0 is powered with the output voltage. While this allows good standby power dissipation, the required involvement of the VCC-sampling capacitor C3 and indirect sampling of the output voltage DC OUT lead to poor load regulation and dynamic characteristics of the output voltage DC OUT.

In some other conventional high-side buck AC/DC SMPS systems, a control chip is powered by a specially-designed high-voltage (HV) power supply unit instead of an output voltage. However, with the same consumed current, powering a control chip using such an HV power supply unit consumes much more power than the design of FIG. 1 using the output voltage as a power supply for the control chip, thus making it difficult for these SMPS systems to achieve ultra-low standby power dissipation.

SUMMARY OF THE INVENTION

It is an objective of the present invention to provide a switch-mode power supply (SMPS) controller, an SMPS system and a power supply method for an SMPS system, in which the SMPS controller is powered with an output voltage and the use of a stand-off capacitor for sampling the output voltage is dispensed with, resulting in reduced standby power dissipation of the system.

To this end, the present invention provides an SMPS controller for control of an output voltage from an SMPS system. The SMPS controller includes an output-voltage power supply unit, a built-in energy storage unit and a logic control unit.

The output-voltage power supply unit has a terminal connected to an output voltage feedback terminal of the SMPS system and another terminal connected to a power input terminal of the built-in energy storage unit, and is configured to charge the built-in energy storage unit using an output voltage from the SMPS system.

The built-in energy storage unit has a power output terminal connected to an operating voltage terminal of the logic control unit and is configured to provide an operating voltage for the logic control unit.

The present invention also provides an SMPS system, including an AC voltage source, a rectifier connected to the AC voltage source, a bus capacitor connected to the rectifier, a bus DC voltage terminal connected to a common terminal to the bus capacitor and the rectifier, and the SMPS controller as defined above. The SMPS controller is connected between the bus DC voltage terminal and an output voltage terminal of an SMPS.

The present invention further provides a power supply method for an SMPS system, which includes:
  providing an SMPS controller including a built-in energy storage unit, an output-voltage power supply unit and a logic control unit, wherein the built-in energy storage unit and the logic control circuit are integrated in a single package; and
  powering the built-in energy storage unit using the output voltage from the switch-mode power supply system by the output-voltage power supply unit such that the built-in energy storage unit provides an operating voltage for the switch-mode power supply controller, which ensures normal operation of the switch-mode power supply controller.

Compared with the prior art, the present invention offers advantages as follows:

1. The built-in energy storage unit and the logic control unit in the SMPS controller are integrated in a single package (i.e., chip). Therefore, in addition to powering the logic control unit with the output voltage, the use of a stand-off capacitor for sampling the output voltage is dispensed with. This allows improved load regulation and dynamic characteristics of the output voltage, makes the system more streamlined and less expensive, and facilitates the SMPS system's miniaturization and simplification.

2. Over most of the loading range (e.g., under conditions of no load or light load), the built-in energy storage unit is charged by the output voltage in order to provide an operating voltage for the logic control unit. Since the output voltage is mild and associated with a small duty cycle and a long demagnetization process, the overall and standby power dissipation of the SMPS controller can be significantly reduced, and the technical bias that a VCC capacitor is very large since a power supply has to be provided by the VCC capacitor when the power transistor is on-state is overcome. Since the VCC capacitor is very large, it will expand the overall circuit area and will not embedded in the package. As a result, the built-in energy storage capacitor is free of such size limitation, and even a small capacitance can meet the power supply requirements of the SMPS system.

3. When the built-in energy storage unit would be insufficient to power the logic control unit, the high-voltage power supply unit instead serves as a power supply for the built-in energy storage unit. In this way, the output-voltage and high-voltage power supplies together provide a hybrid power supply solution, which enables chip activation of the SMPS controller, establishment of an output therefrom and maintenance of the controller system in normal operation following the establishment. In addition, by maximizing the utilization of the output voltage, and minimizing that of the high-voltage power supply unit, as a power supply for the built-in energy storage unit, the contribution of the high-voltage power supply unit to the required electricity is reduced as possible as applicable, thus ensuring minimal standby power dissipation and high light-load efficiency of the SMPS system.

4. The present invention is applicable to, e.g., applications with strict requirements on standby power dissipation, particularly those requiring the use of non-isolated auxiliary power supplies.

DETAILED DESCRIPTION

The present invention will be described below in greater detail by way of specific embodiments with reference to the accompanying drawings. Features and advantages of the invention will be more apparent from the following description. Note that the figures are presented in a very simplified form not necessarily drawn to exact scale for the only purpose of helping to explain the disclosed embodiments in a more convenient and clearer way.

Figure 1:
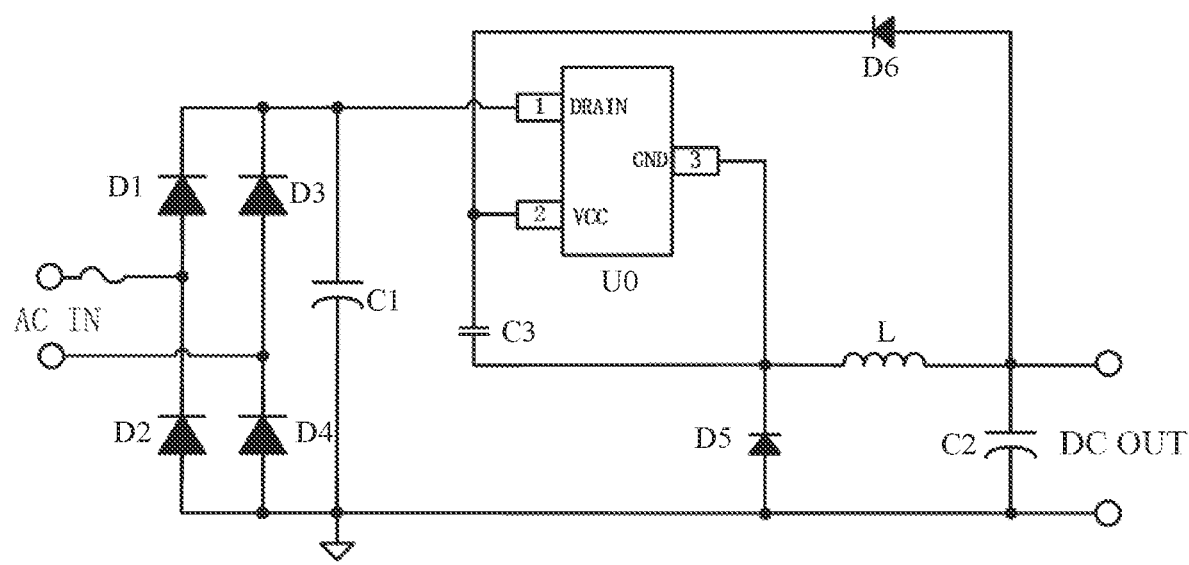
FIG. 1 shows a schematic circuit diagram of a conventional high-side buck AC/DC switch-mode power supply (SMPS) system incorporating a stand-off VCC sampling capacitor.
Figure 2:
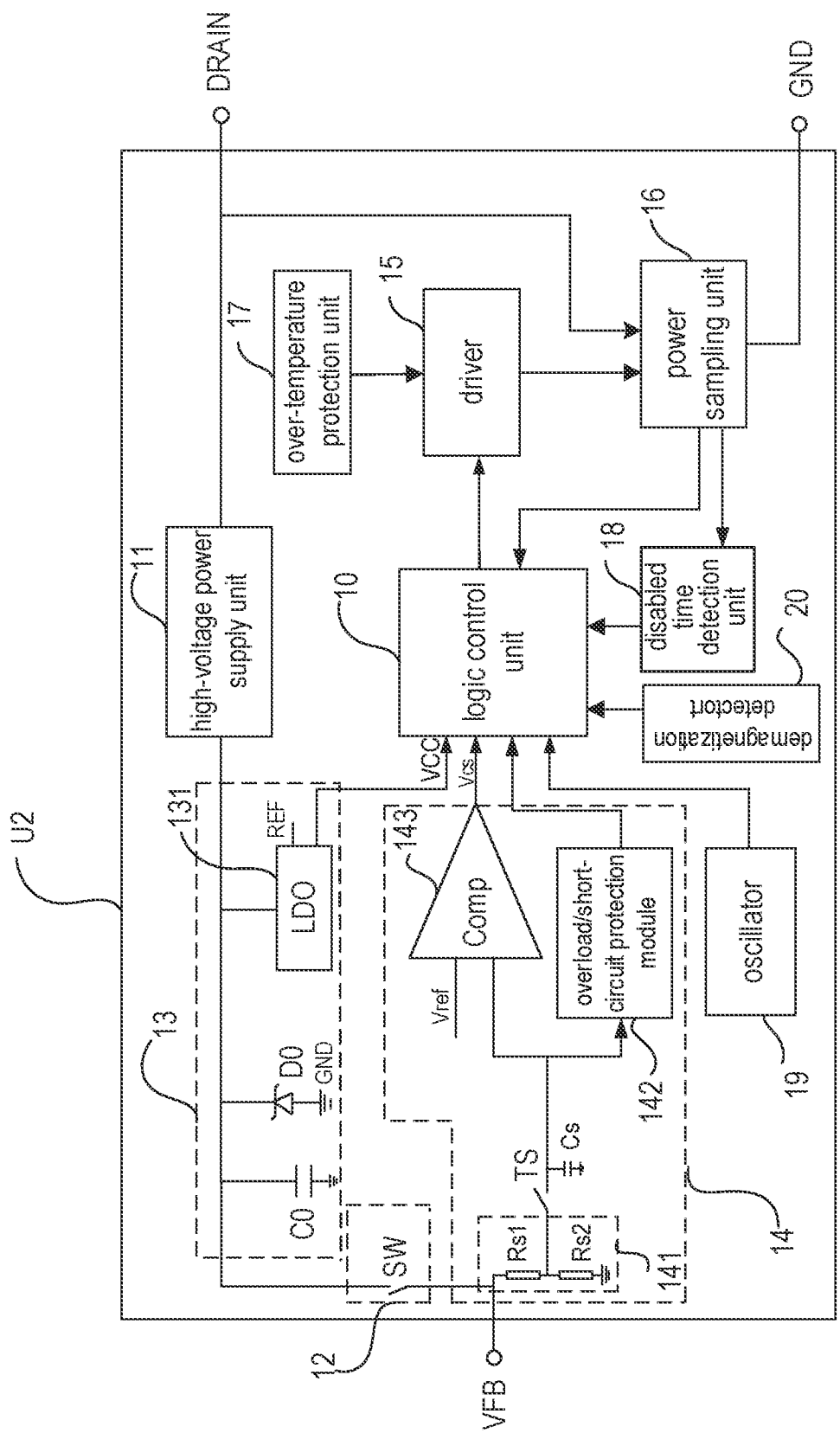
FIG. 2 shows a schematic circuit diagram of an SMPS controller according to an embodiment of the present invention.
Figure 3:
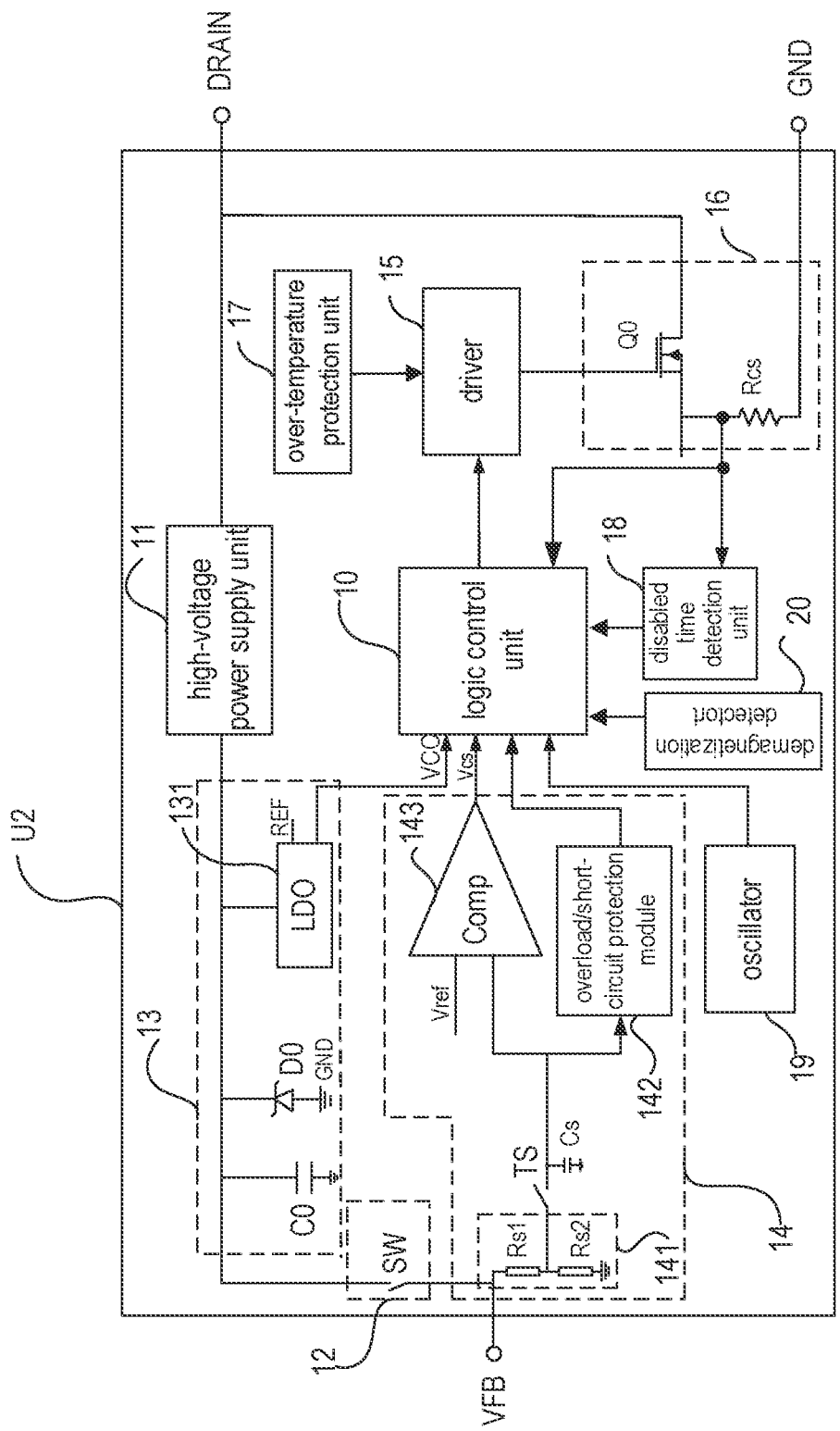
FIG. 3 shows a schematic circuit diagram of a particular example of the SMPS controller of FIG. 2.
Figure 4:
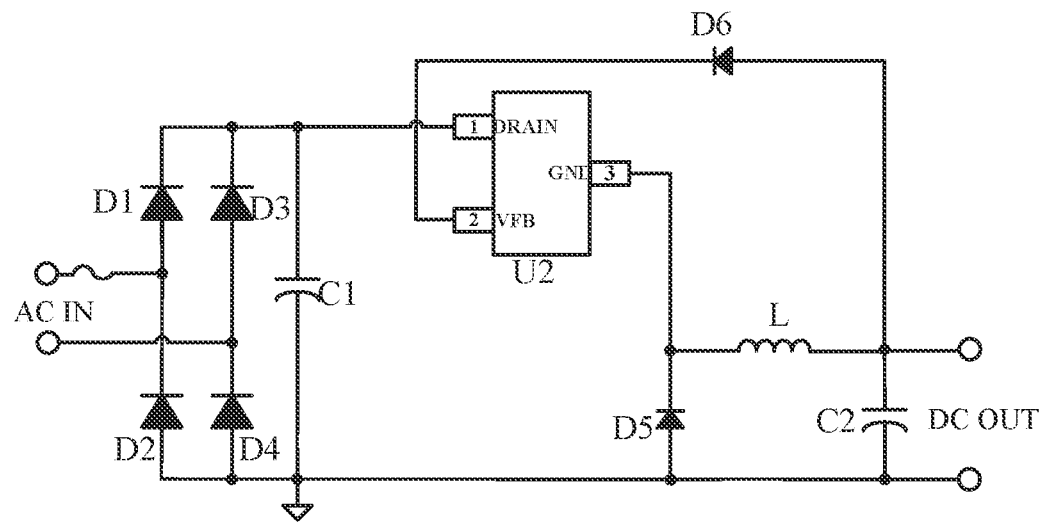
FIG. 4 shows a structural schematic of an SMPS system according to an embodiment of the present invention.

Referring to FIGS. 2 to 4, in embodiments of the present invention, there is provided a switch-mode power supply (SMPS) controller U2 for control of an output voltage DC OUT from an SMPS system. The SMPS controller U2 includes a logic control unit 10, a high-voltage power supply unit 11, an output-voltage power supply unit 12, a built-in energy storage unit 13, a feedback module 14, a driver 15, a power sampling unit 16, an over-temperature protection unit 17, a disabled time detection unit 18, an oscillator 19 and a demagnetization detector 20. These are all integrated in a single package (i.e., chip). That is, in this embodiment, the SMPS controller is an SMPS control chip. The output-voltage power supply unit 12 includes a first electronic switch SW. The built-in energy storage unit 13 includes an energy storage capacitor C0, a Zener diode D0 and a low-dropout regulator LDO. The oscillator (OSC) 19 is electrically connected to the logic control unit 10 in order to regulate an operating frequency of the SMPS system.

The output-voltage power supply unit 12 is configured to charge the energy storage capacitor C0 using the output voltage DC OUT from the SMPS system. The first electronic switch SW in the output-voltage power supply unit 12 has a path connected to an output voltage feedback terminal VFB of the SMPS system at one end and to both one terminal of the energy storage capacitor C0 and a cathode terminal of the Zener diode D0 at the other end. A control terminal of the first electronic switch SW is connected to a corresponding signal output terminal of the logic control unit 10 so that the first electronic switch SW can be turned on to charge the energy storage capacitor C0 with the output voltage DC OUT, or turned off, under the control of the logic control unit 10. The first electronic switch SW may be implemented as a MOS transistor, a triode or the like.

The built-in energy storage unit 13 is configured to provide the logic control unit 10 with such an operating voltage that allows the SMPS controller U2 to assume one of several states including normal operating, standby, etc. In the built-in energy storage unit 13, one terminal of the energy storage capacitor C0 and an anode terminal of the Zener diode D0 are both grounded, with the other terminal of the energy storage capacitor C0 and the cathode terminal of the Zener diode D0 being both connected to a voltage input terminal of the low-dropout regulator LDO, which serves as a power input terminal of the built-in energy storage unit 13. Additionally, a voltage output terminal of the low-dropout regulator LDO acts as a power output terminal of the built-in energy storage unit 13, which is connected to an operating voltage terminal of the logic control unit 10. The low-dropout regulator LDO has a further voltage input terminal received a first reference voltage REF. The low-dropout regulator LDO is configured to provide the logic control unit 10 with a desired operating voltage by regulating a voltage from the energy storage capacitor C0 in accordance with the first reference voltage REF. The energy storage capacitor C0 may have a capacitance of 200 pF, and the Zener diode D0 may be a 10 V Zener diode.

An input terminal of the high-voltage power supply unit 11 is connected to a bus DC voltage terminal DRAIN of the SMPS system (i.e., a drain of a power switch Q0), and an output terminal of the high-voltage power supply unit 11 is connected to the power input terminal of the built-in energy storage unit 13. The high-voltage power supply unit 11 is configured to charge the energy storage capacitor C0 in stages in which the energy storage capacitor C0 would be insufficient to provide the logic control unit 10 with a desired operating voltage. Reference can be made to CN104124878A, a previous patent application by the inventors, for more details in circuit design of the high-voltage power supply unit 11, and a further detailed description thereof is therefore deemed unnecessary and omitted herein.

The stages in which the energy storage capacitor C0 would be insufficient to provide the logic control unit 10 with a desired operating voltage and the energy storage capacitor C0 is instead charged by the high-voltage power supply unit 11 include a stage before the SMPS controller is activated and an output therefrom is established and a stage with the voltage VCC on the energy storage capacitor C0 being lower than a predetermined threshold within a period from an end time of a demagnetization process to a start time of a subsequent on/off cycle of the power switch Q0 in a discontinuous conduction mode (DCM).

Specifically, before the SMPS control chip U2 is activated and an output therefrom has been established, the energy storage capacitor C0 is charged by the high-voltage power supply unit 11. That is, SMPS controller U2 is directly powered by the high-voltage power supply unit 11. This allows rapid activation of the SMPS controller U2. After an output from the SMPS control chip U2 has been established, within a demagnetization process with the power switch Q0 having been turned off, the energy storage capacitor C0 is powered with the output voltage DC OUT except in a sampling period. This reduces the chip's dissipation, resulting in improved efficiency of the system. Within a continuous conduction mode (CCM) demagnetization process, the energy storage capacitor C0 is powered with the output voltage DC OUT except in a sampling period. Likewise, during a DCM demagnetization process, the energy storage capacitor C0 is also powered with the output voltage DC OUT except in a sampling period. After the demagnetization process has ended and before the next on/off cycle of the power switch Q0 begins, the SMPS controller U2 may operate in a standby mode, where most of its circuit components are off-state in order to minimize a quiescent current. Thus, the duration with the energy storage capacitor C0 keeping an output can be maximized, and only when the voltage VCC on the energy storage capacitor C0 becomes lower than a predetermined threshold, the high-voltage power supply unit 11 is activated to charge the energy storage capacitor C0 to make ensure the SMPS control chip U2 can operate normally.

As an example, the logic control unit 10 may be designed to optimize a ratio of durations respectively with the output-voltage power supply unit 12 and the high-voltage power supply unit 11 serving as a power supply so that, under the control of the logic control unit, the built-in energy storage unit 13 can be charged by the output-voltage power supply unit 12 over most of a load range of the SMPS system. In this way, the output-voltage power supply unit 12 can make full use of the output voltage DC OUT of the SMPS system to power the energy storage capacitor C0, with the chance of direct powering of the energy storage capacitor C0 by the high-voltage power supply unit 11 being minimized. As a result, standby and overall power dissipation of the SMPS controller can be significantly reduced, and even a small capacitance can meet the powering requirements of the SMPS system. Moreover, by powering the energy storage capacitor C0 with the output-voltage power supply unit 12 over most of the load range of the SMPS system, e.g., under conditions of no load or light load, the output-voltage power supply unit 12 can provide most of electricity that the system requires, with the high-voltage power supply unit 11 making only a small contribution thereto. In this way, minimal standby power dissipation and high light-load efficiency of the SMPS system can be ensured.

Referring to FIG. 3, the power sampling unit 16 includes a power switch Q0 and a sampling resistor Rcs. A drain of the power switch Q0 is connected to the bus DC voltage terminal DRAIN of the SMPS system, and a source of the power switch Q0 is connected to one end of the sampling resistor Rcs. Additionally, a gate of the power switch Q0 is connected to the driver 15, and the other end of the sampling resistor Rcs is grounded. The sampling resistor Rcs is configured to sample a current flowing through the power switch Q0 and thus detect any change in load of the SMPS system. As such, the logic control unit 10 can control the output-voltage power supply unit 12 based on measurements from the power sampling unit 16 such that the output-voltage power supply unit 12 is able to charge the built-in energy storage unit 13 prior and/or subsequent to the current sampling period of the power sampling unit 16. Of course, in other embodiments of the present invention, the sampling resistor Rcs may be replaced with, among others, a MOS transistor or a triode.

An input terminal of the driver 15 is connected to the logic control unit 10, and another input terminal of the driver 15 is connected to the over-temperature protection unit 17. An output terminal of the driver 15 is connected to the gate of the power switch Q0. The driver 15 is configured to control the output voltage DC OUT of the SMPS system through turning on/off the power switch Q0 according to the logic control unit 10. In response to the power switch Q0 being turned off, a demagnetization process begins in an inductor L of FIG. 2. Under the control of the logic control unit 10, the output-voltage power supply unit 12 starts to charge the built-in energy storage unit 13 according to the output voltage DC OUT adapted by the driver 15.

The over-temperature protection unit 17 is configured to detect a chip temperature of the SMPS controller and instruct the driver 15 to turn off the power switch Q0 when the chip temperature is found to exceed a predetermined temperature threshold, in order to avoid failure of the power switch Q0 at an excessively high temperature. In addition, this can also reduce a power output from the SMPS system and thus lower the chip temperature in a timely way.

An output terminal of the disabled time detection unit 18, also known as a leading edge blanking (LEB) unit, is connected to the logic control unit 10, and an input terminal of the disabled time detection unit 18 is connected to the source of the power switch Q0. The disabled time detection unit 18 is configured to feed a disabled time period for allowing the current sampling action of the power sampling unit 16 back to the logic control unit 10. Based on this feedback from the disabled time detection unit 18, the logic control unit 10 instructs the output-voltage power supply unit 12 to charge the built-in energy storage capacitor C0 except in the sampling period during the demagnetization process with the power switch Q0 being turned off.

An output terminal of the demagnetization detector 20 is connected to the logic control unit 10 and an input terminal thereof to VFB. The demagnetization detector 20 is configured to detect the time when a voltage present at VFB indicating a current flowing through the power switch across zero power switch, i.e., a demagnetization process of the SMPS system, and output it to the logic control unit 10. In other words, the demagnetization detector 20 is able to detect an end time of the SMPS system's demagnetization process and feed this back to the logic control unit 10. Based on the feedback from the demagnetization detector 20, the logic control unit 10 instructs the output-voltage power supply unit 12 to charge the energy storage capacitor C0 in the built-in energy storage unit 13 over an appropriate portion of the demagnetization process.

The feedback module 14 includes a voltage sampling module 141, a second electronic switch Ts, a filtering capacitor Cs and a comparator Comp. The second electronic switch Ts may be an electronic device such as a MOS transistor, a triode or the like. The voltage sampling module 141 includes two voltage sampling resistors Rs1, Rs2 connected in series between the output voltage feedback terminal VFB and the ground. The two voltage sampling resistors Rs1, Rs2 are connected to each other at a node where a sampling output terminal of the voltage sampling module 141 is arranged, which is connected to one end of a path in the second electronic switch Ts. One end of the sampling resistor Rs1, to which the output voltage feedback terminal VFB is connected, forms a sampling input terminal of the voltage sampling module 141. In this embodiment, the two voltage sampling resistors Rs1, Rs2 are both arranged within the chip of the SMPS controller. The other end of the path in the second electronic switch Ts is connected to the filtering capacitor Cs and to an input terminal of the comparator Comp. A control terminal of the second electronic switch Ts is connected to a corresponding signal output terminal of the logic control unit 10. Another input terminal of the comparator Comp is coupled to a second reference voltage Vref, and an output terminal of the comparator Comp is connected to an output compensation terminal Vcomp of the logic control unit 10. The second electronic switch Ts is configured to be on-state under the control of the logic control unit 10, allowing sampling of the output voltage DC OUT. The comparator Comp is configured to compare the sampled voltage with the second reference voltage Vref and output a voltage compensation signal Vcomp based on the comparison. From the signal Vcomp, the logic control unit 10 is able to generate a pulse width modulation (PWM) or pulse frequency modulation (PFM) signal, which instructs the driver 15 to turn on or off the power switch Q0, thus controlling the output voltage DC OUT from the SMPS system.

Optionally, the feedback module 14 further includes an overload/short-circuit protection module 142 having an input terminal connected to the end of the second electronic switch Ts to which the comparator Comp is connected and having an output terminal connected to a corresponding input terminal of the logic control unit 10. The overload/short-circuit protection module 142 is configured to provide protection to the SMPS system by controlling an output current flowing through the power switch Q0 and the load when there is a short circuit and/or overload in the SMPS system. Reference can be made to CN105870896A, a previous patent application by the inventors, for more details in circuit design of the overload/short-circuit protection module 142, and a further detailed description thereof is therefore deemed unnecessary and omitted herein.

Referring to FIGS. 2 to 4, in the present embodiments, there is also provided an SMPS system including: an AC voltage source AC IN; a rectifier connected to the AC voltage source AC IN; a bus capacitor C1 connected to the rectifier; a bus DC voltage terminal DRAIN connected to a common terminal to the bus capacitor C1 and the rectifier; an SMPS controller U2 as described above; an inductor L; diodes D5, D6; and an output capacitor C2. The SMPS controller U2 is connected between the bus DC voltage terminal DRAIN and an output voltage terminal DC OUT of the SMPS system. The rectifier includes four diodes D1-D4. One end of the inductor L is connected to a cathode terminal of the diode D5 and a ground terminal of the SMPS controller U2, and the other end of the inductor L is connected to one end of the output capacitor C2 and an anode terminal of the diode D6. The other end of the output capacitor C2 and an anode terminal of the diode D5 are both grounded. A cathode terminal of the diode D6 is connected to an output voltage feedback terminal VFB of the SMPS controller U2. A DC voltage Vbus is resulted from rectification by the four diodes D1-D4 and filtering by the bus capacitor C1 of an AC voltage from the AC voltage source AC IN. The power switch Q0, the inductor L, the diode D6 and the output capacitor C2 make up a typical high-side buck SMPS topology. The diode D6 may be able to isolate a high voltage present during the activation of the SMPS controller U2. In this case, the voltage sampling resistor Rs1 and Rs2 are allowed to be chosen as either low-voltage or high-voltage resistors. In other embodiments of the present invention, in case of the voltage sampling resistors Rs1 and Rs2 in the feedback module 14 being chosen as high-voltage resistors, D6 may be omitted, thus additionally simplifying the peripheral circuitry.

Referring to FIGS. 2 to 11, in the present embodiments, there is also provided a power supply method for an SMPS system. This method is suitable for use with an SMPS system as described above and includes the steps detailed below.

First of all, before an SMPS control chip U2 in the SMPS system is activated and an output therefrom has been established, an energy storage capacitor C0 in a built-in energy storage unit 13 in the SMPS controller is charged by a high-voltage power supply unit 11. As a result, the built-in energy storage unit 13 provides the SMPS controller with an operating voltage, which allows the activation of the SMPS controller and the establishment of an output therefrom. Specifically, in order to activate the SMPS system, the high-voltage power supply unit 11 charges the energy storage capacitor C0 so that the voltage VCC on the energy storage capacitor C0 gradually rises from an initial value of zero. When the voltage VCC becomes equal to or higher than an operating voltage threshold, the logic control unit 10 causes the high-voltage power supply unit 11 to be turned off, accomplishing the activation of the system.

After an output from the SMPS control chip U2 has been established, with the power switch Q0 being turned off, the output-voltage power supply unit 12 charges the energy storage capacitor C0 using the output voltage DC OUT from the SMPS system during a demagnetization process except in a sampling period Ts. Thus, the built-in energy storage unit 13 provides the SMPS controller U2 with an operating voltage which ensures normal operation of the SMPS controller U2. Specifically, in each on/off cycle of the power switch Q0, the SMPS controller U2 samples the output voltage DC OUT using the feedback module 14. After the power switch Q0 is turned off, with a demagnetization process ongoing in the inductor L, the first electronic switch SW is turned on, and the output voltage DC OUT changes the energy storage capacitor C0 via the diode D6, the output voltage feedback terminal VFB and the first electronic switch SW. The switch SW is turned off at the beginning of the sampling period and after the demagnetization process has ended.

The method will be further explained with reference to the timing diagrams illustrated in FIGS. 5 to 10. In each of these figures, "SW_Charge" denotes a timing curve for turning on/off the first electronic switch SW, in which the high level indicates an "ON" state. "VFB" denotes a timing curve of the output voltage DC OUT, and "TS" denotes a timing curve for turning on/off the second electronic switch Ts, in which the high level indicates an "ON" state. This curve is also a timing curve for the sampling period.

Figure 5:
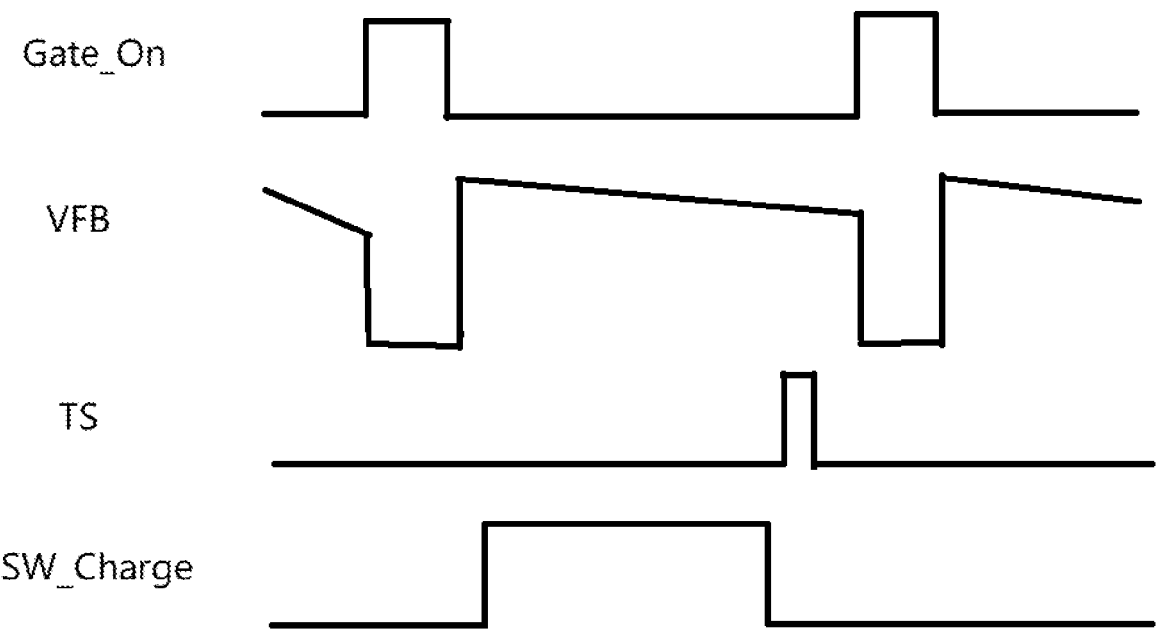
FIGS. 5 to 10 show example charging and sampling timing diagrams of a power supply method for an SMPS system according to an embodiment of the present invention.

FIG. 5 shows a timing scheme for charging and sampling of the SMPS system operating in a continuous conduction mode (CCM), where after an output from the SMPS control chip U2 has been established, except duration that the power switch Q0 is on-state, the system operates in demagnetization process, in which, except in a sampling period Ts, the energy storage capacitor C0 can be always charged using the output voltage DC OUT, and the charging (with SW_Charge being high) precedes the sampling period Ts (with TS being high). In CCM, a current in the inductor L will never drop to zero within any on/off cycle of the power switch Q0. In other words, the inductor L will never be "reset", meaning that a magnetic flux in the inductor L will never across zero during any on/off cycle, and there will be a current in a coil of the inductor L even when the power switch Q0 is off-state.

Figure 6:
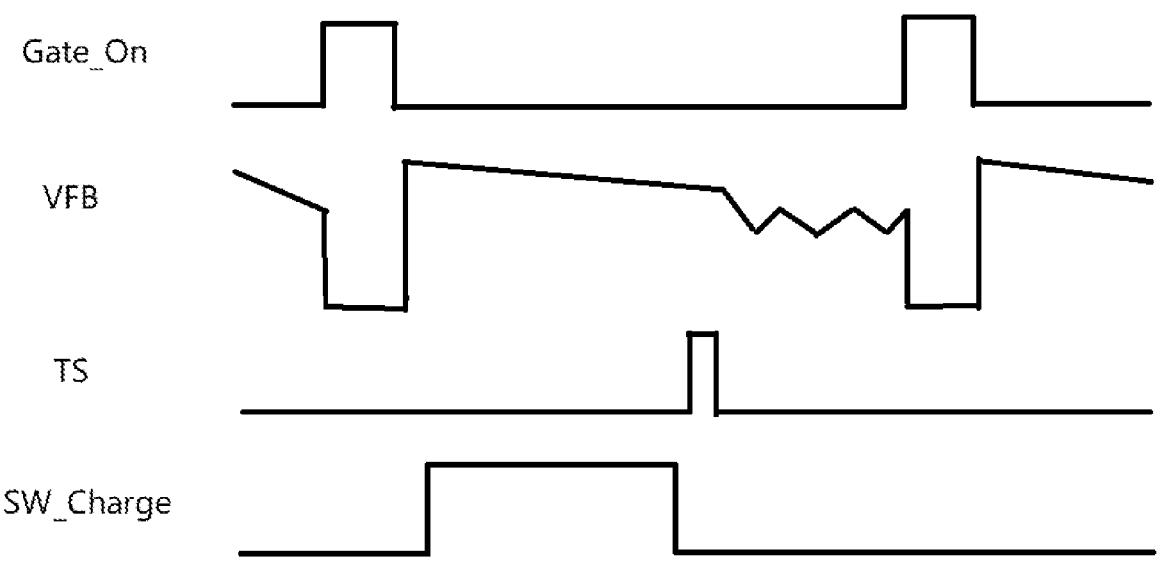

FIG. 6 shows a timing scheme for charging and sampling of the SMPS system operating in a discontinuous conduction mode (DCM), where after an output from the SMPS control chip U2 has been established, and after the power switch Q0 is turned off, the energy storage capacitor C0 is likewise charged with the output voltage DC OUT via the first electronic switch SW during demagnetization except in a sampling period Ts, and the charging (with SW_Charge being high) precedes the sampling period Ts (with TS being high). In the DCM, a current in the inductor L will across zero within each on/off cycle of the power switch Q0, which means that the inductor L will be appropriately "reset". That is, a current in the inductor L across zero when the power switch Q0 is off-state.

Figure 7:
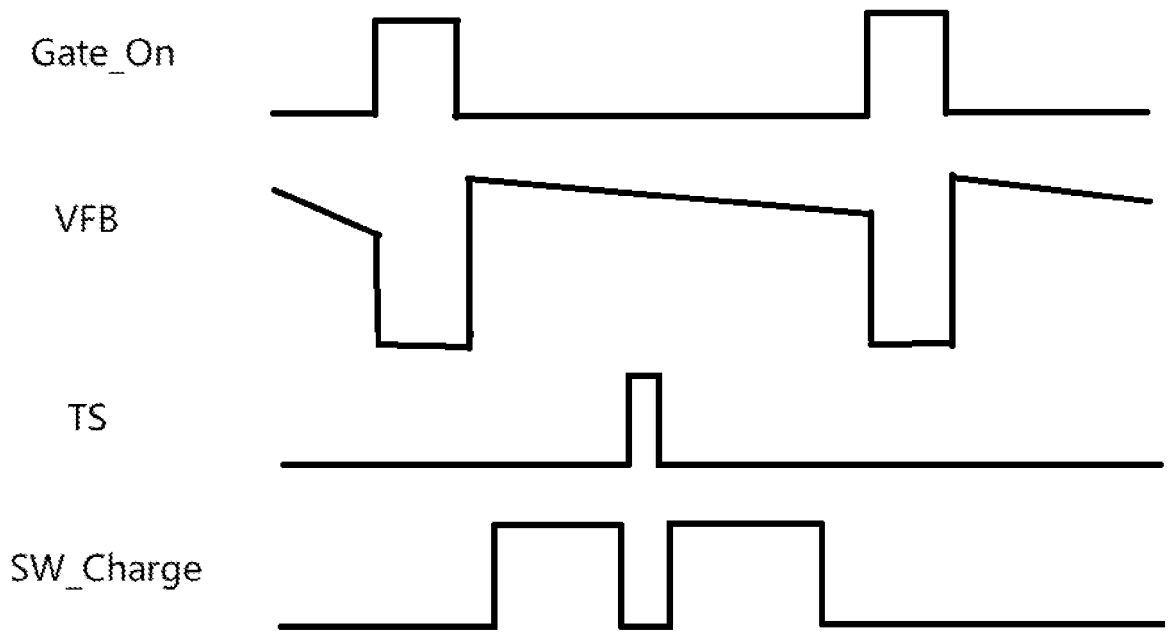
Figure 8:
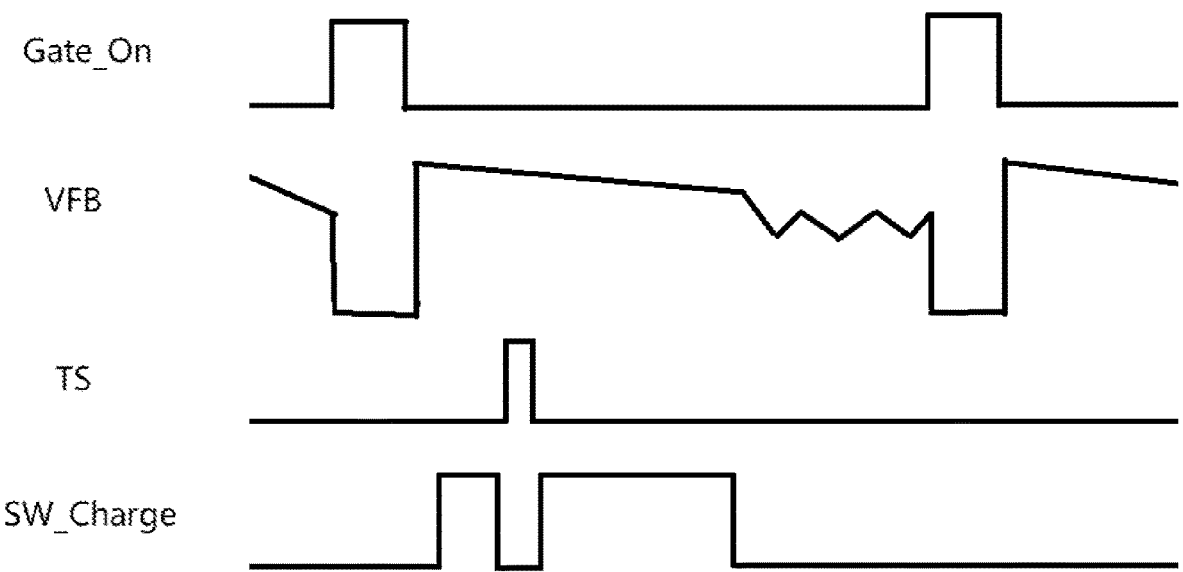

FIG. 7 shows another CCM timing scheme for charging and sampling of the SMPS system, and FIG. 8 shows another DCM timing scheme for charging and sampling of the SMPS system. In both, there is a sampling period Ts during demagnetization. Similarly, after an output from the SMPS control chip U2 has been established, and when the power switch Q0 is off-state, the output voltage DC OUT charges the energy storage capacitor C0 via the first electronic switch SW during demagnetization except in the sampling period. Accordingly, in both cases, the charging (with SW_Charge being high) occurs in two non-sampling periods respectively preceding and following the sampling period Ts (with TS being high).

Figure 9:
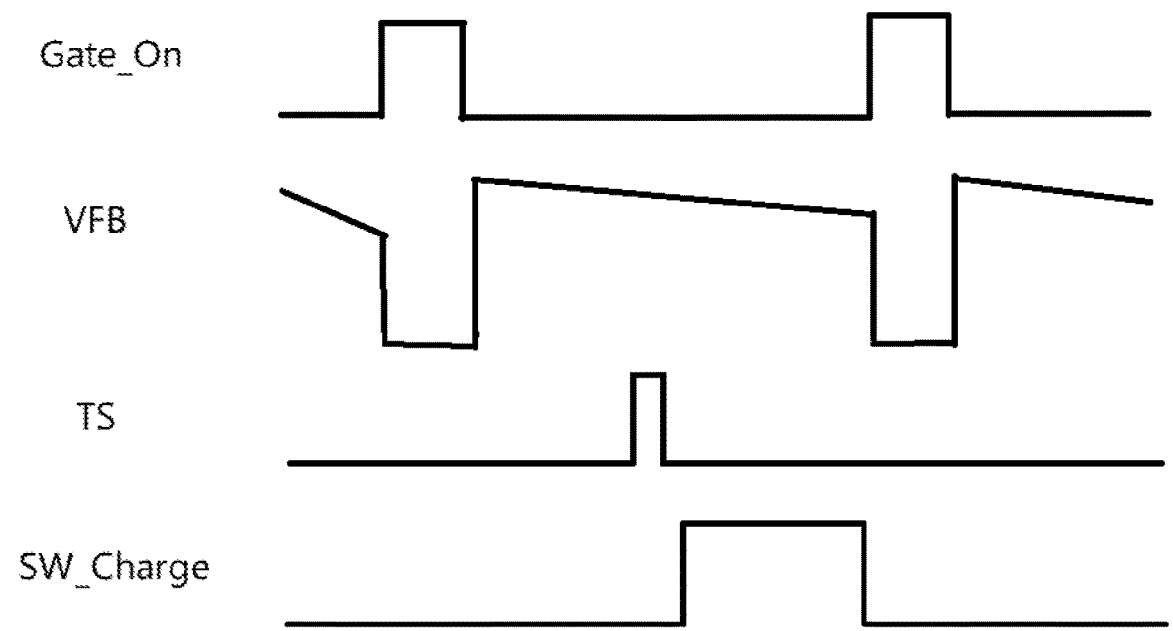
Figure 10:
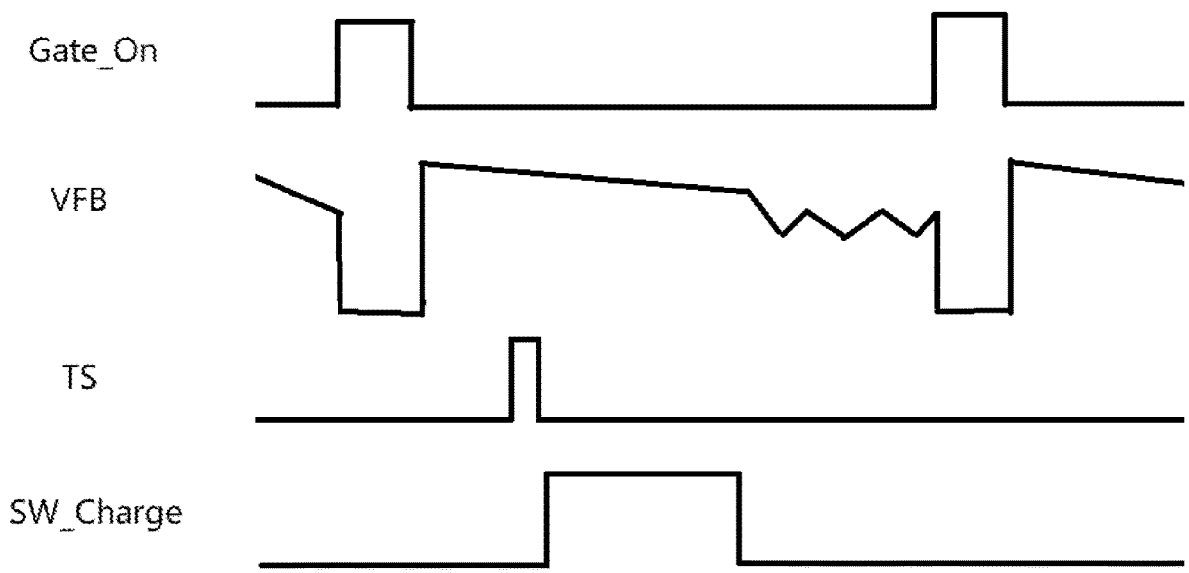

FIG. 9 shows a further CCM timing scheme for charging and sampling of the SMPS system, and FIG. 10 shows a further DCM timing scheme for charging and sampling of the SMPS system. In both, after an output from the SMPS control chip U2 has been established, and when the power switch Q0 is off-state, the output voltage DC OUT charges the energy storage capacitor C0 via the first electronic switch SW in a non-sampling period during demagnetization. Accordingly, in both cases, the charging (with SW_Charge being high) follows a sampling period Ts (with TS being high).

It is to be noted that, for most loads, the high-side buck SMPS system operates in the CCM. In this case, the SMPS controller U2 can be totally powered with the output voltage DC OUT by the output-voltage power supply unit and the built-in energy storage unit, resulting in reduced chip dissipation of the SMPS controller U2 and increased system efficiency. On the other hand, when the SMPS system operates in the DCM, the energy storage capacitor C0 is charged using the output voltage DC OUT during demagnetization except in a sampling period, and the SMPS controller U2 stays in a standby mode over a period from an end time of the demagnetization process to a start time of the next on/off cycle, where most of the circuit components are off-state in order to minimize a quiescent current. In this way, the duration with the logic control unit 10 being powered by the energy storage capacitor C0 can be maximized. Upon the voltage VCC on the energy storage capacitor C0 dropping below a certain value, the energy storage capacitor C0 is charged by the high-voltage power supply unit to ensure normal operation of the SMPS controller U2. Therefore, by optimizing parameters including the durations with the output-voltage power supply unit 12 and the high-voltage power supply unit 11 respectively serving as a power supply, the standby current in the SMPS controller U2 and the voltage on the built-in energy storage capacitor C0, the SMPS system can operate with the output-voltage power supply unit 12 and the energy storage capacitor C0 keeping providing an operating voltage for the SMPS controller U2 from the output voltage DC OUT over most of the load range. In particular, under conditions of no load or light load, the output-voltage power supply unit 12 and energy storage capacitor C0 can provide most of the required electricity by means of the output voltage DC OUT, with the high-voltage power supply unit 11 making only a minimal contribution thereto. This ensures low standby power dissipation and high light-load efficiency of the system.

In the method described above, the output voltage DC OUT is moderate in magnitude and is associated with a small duty cycle and a long demagnetization process, and the output-voltage and high-voltage power supply units together provide a hybrid power supply solution allowing full utilization of the output voltage DC OUT as a power supply and a minimized proportion of direct powering by the high-voltage power supply unit. Thus, overall and standby power dissipation can be significantly reduced, and increased light-load efficiency can be achieved.

While the SMPS controller, SMPS system and power supply method of the present invention have been described in the above embodiments with the logic control unit 10, the high-voltage power supply unit 11, the output-voltage power supply unit 12, the built-in energy storage unit 13, the feedback module 14, the driver 15, the power sampling unit 16, the over-temperature protection unit 17, the disabled time detection unit 18, the oscillator 19 and the demagnetization detector 20 being integrated in a single package (i.e., chip) that serves as a standalone module, as an example, the present invention is not so limited. In other embodiments of the present invention, it is also possible that at least one of the logic control unit 10, the high-voltage power supply unit 11, the output-voltage power supply unit 12, the built-in energy storage unit 13, the feedback module 14, the driver 15, the power sampling unit 16, the over-temperature protection unit 17, the disabled time detection unit 18, the oscillator 19 and the demagnetization detector 20 is integrated, as a whole or in part, with other(s) thereof to form a functional module. For example, the feedback module 14 may be integrated with the demagnetization detector 20 to form a multifunctional module that is capable of both detecting a voltage at the terminal VFB to allow the driver 15 to control the output voltage under the control of the logic control unit 10, and detecting a demagnetization process to allow the output-voltage power supply unit to charge the built-in energy storage unit 13 under the control of the logic control unit 10 within the demagnetization process. In other embodiments of the present invention, it is also possible that at least one of the logic control unit 10, the high-voltage power supply unit 11, the output-voltage power supply unit 12, the built-in energy storage unit 13, the feedback module 14, the driver 15, the power sampling unit 16, the over-temperature protection unit 17, the disabled time detection unit 18, the oscillator 19 and the demagnetization detector 20 partially or wholly stands off the SMPS control chip, while all the others thereof are integrated in the same chip. For example, only the voltage sampling resistors Rs1, Rs2 in the voltage sampling module 141 in the feedback module 14 may stand off the SMPS control chip, while all the other components and elements of the SMPS controller are integrated in the SMPS control chip.

Figure 11:
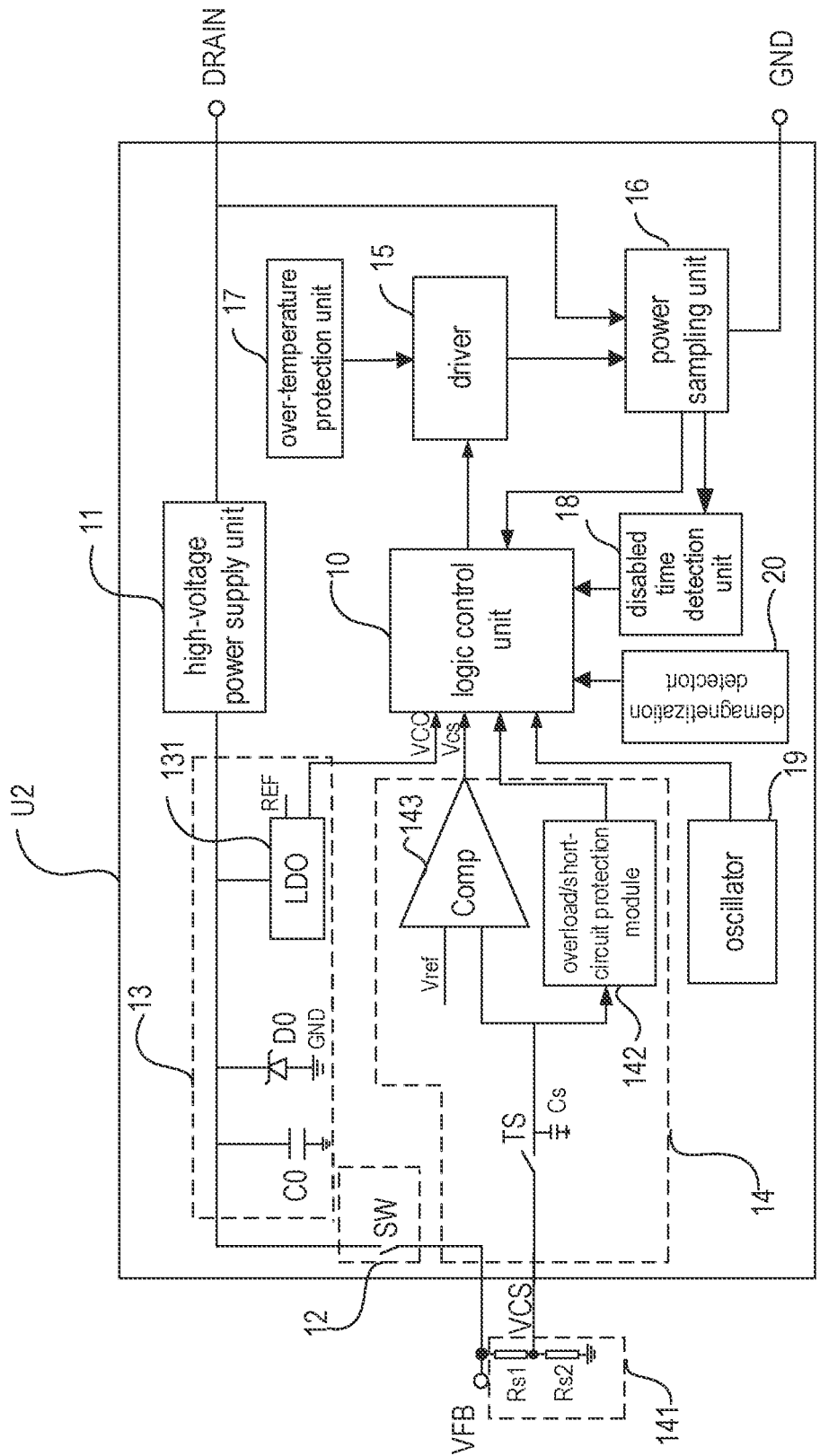
FIG. 11 shows a schematic circuit diagram of an SMPS controller according to another embodiment of the present invention.
Figure 12:
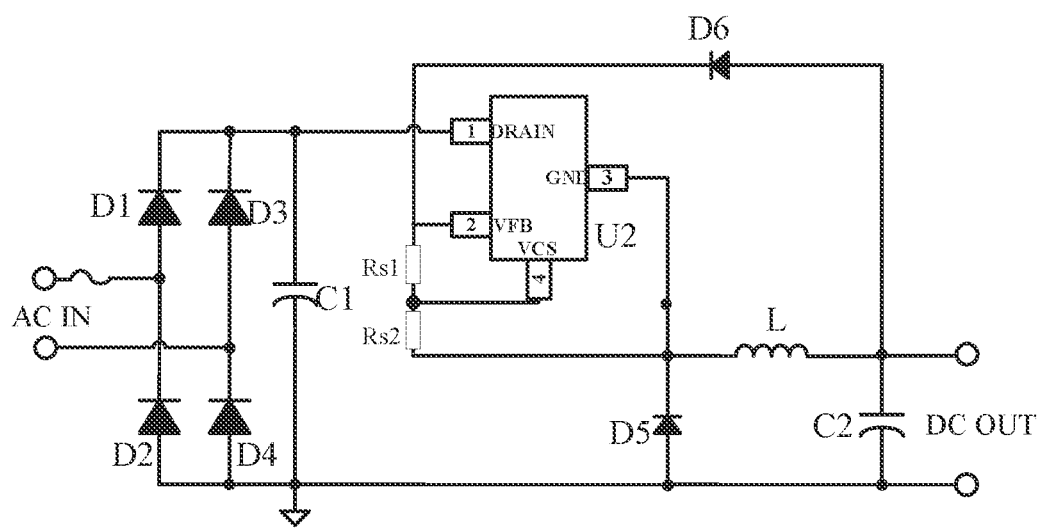
FIG. 12 shows a structural schematic of an SMPS system according to another embodiment of the present invention.

Specifically, referring to FIGS. 11 and 12, a SMPS controller U2 for control of an output voltage DC OUT from an SMPS system according to another embodiment of the present invention includes a logic control unit 10, a high-voltage power supply unit 11, an output-voltage power supply unit 12, a built-in energy storage unit 13, a feedback module 14, a driver 15, a power sampling unit 16, an over-temperature protection unit 17, a disabled time detection unit 18 and an oscillator 19. The output-voltage power supply unit 12 includes a first electronic switch SW, and the built-in energy storage unit 13 includes an energy storage capacitor C0, a Zener diode D0 and a low-dropout regulator LDO. Additionally, the power sampling unit 16 includes a power switch Q0 and sampling resistor Rcs, the feedback module 14 includes a voltage sampling module 141, a second electronic switch Ts, a filtering capacitor Cs and a comparator Comp. Further, the voltage sampling module 141 includes two voltage sampling resistors Rs1, Rs2 that are connected between an output voltage feedback terminal VFB and the ground.

All the logic control unit 10, the high-voltage power supply unit 11, the output-voltage power supply unit 12, the built-in energy storage unit 13, the second electronic switch Ts, the filtering capacitor Cs, the comparator Comp, the driver 15, the power sampling unit 16, the over-temperature protection unit 17, the disabled time detection unit 18 and the oscillator 19 are integrated in a single chip to form an SMPS control chip. The voltage sampling resistors Rs1, Rs2 are separate from the SMPS control chip and are thus adjustable to result in a change in the output voltage DC OUT, making the controller more flexible in application.

As can be seen, compared with the SMPS control chip corresponding to the SMPS controller U2 shown in FIG. 2, instead of internal voltage sampling resistors, the feedback module in the SMPS control chip corresponding to the SMPS controller U2 according to this embodiment is provided with an external input terminal VCS for sampling a voltage, a replaceable stand-off voltage sampling resistor Rs1 connected between the terminal VCS and the output voltage feedback terminal VFB and another replaceable stand-off voltage sampling resistor Rs2 connected between the terminal VCS and one end of an inductor L.

Referring to FIG. 12, in the present embodiments, there is also provided an SMPS system incorporating the SMPS control chip corresponding to the SMPS controller U2 of the FIG. 11. This SMPS system further includes an AC voltage source AC IN, a rectifier connected to the AC voltage source AC IN, a bus capacitor C1 connected to the rectifier, a bus DC voltage terminal DRAIN connected to a common terminal to the bus capacitor C1 and the rectifier, replaceable voltage sampling resistors Rs1, Rs2, an inductor L, a diode D5 and an output capacitor C2. The voltage sampling resistor Rs1 is connected between a terminal VCS of the SMPS control chip and an output voltage feedback terminal VFB, and the voltage sampling resistor Rs2 is connected between the terminal VCS and one end of the inductor L. A power supply method for the SMPS system according to this embodiment may be the same as described above, and a further detailed description thereof is therefore deemed unnecessary and omitted herein.

In this embodiment, when the voltage sampling resistors Rs1, Rs2 are implemented as low-voltage resistors, a diode D6 may be further connected between the output voltage feedback terminal VFB and the output voltage DC OUT. By contrast, when the voltage sampling resistors Rs1, Rs2 are chosen as high-voltage resistors, the diode D6 may be omitted, additionally simplifying the circuit structure.

It is to be noted that although the energy storage element in the built-in energy storage unit 13 has been described in the above embodiments as being a capacitor as an example, the present invention is not so limited because the energy storage element in the built-in energy storage unit 13 may be replaced with, among others, an inductor or a combination of a capacitor and an inductor. Additionally, while the output-voltage power supply unit 12 has been described in the above embodiments as the simplest form consisting of one first electronic switch SW implementable as, among others, a MOS transistor or a triode, which can simply the structure of the SMPS controller and reduce its power dissipation as much as possible, the present invention is not so limited because the output-voltage power supply unit 12 may be any other suitable circuit capable of being connected to the control terminal of the logic control unit and providing a current path connecting the terminal VFB to one end of the energy storage capacitor C0 under the control of the logic control unit. Such a circuit may be composed of multiple MOS transistors, although a more complicated circuit structure of the output-voltage power supply unit 12 would lead to greater power consumption of the SMPS controller.

It is to be also noted that although the above embodiments have been described with the output-voltage power supply unit 12 and the high-voltage power supply unit 11 together entailing a hybrid power supply approach, the present invention is not so limited. For example, in other embodiments of the present invention, in an example high-side buck SMPS system for powering a load operating exclusively in a CCM mode, the SMPS controller may be provided with a VCC external connection port or a Vin external connection port, and the high-voltage power supply unit in the SMPS controller may be replaced with a high-voltage resistor (not shown). One end of the high-voltage resistor may be connected to the VCC or Vin external connection port and thus to a bus voltage, with the other end of the high-voltage resistor being coupled to LDO. In this way, the high-voltage power supply unit 11 may be omitted from the SMPS controller, and in this case, except for being powered by the bus voltage Vbus in the stage of chip activation of the SMPS controller and establishment of an output therefrom, the logic control unit 10 can be always powered with the output voltage DC OUT by the output-voltage power supply unit 12 and the built-in energy storage unit 13. As a result, a simplified structure, reduced chip power dissipation and improved system efficiency of the SMPS controller can be achieved.

Further, the present invention is applicable not only to high-side buck SMPS systems, but also to any other suitable SMPS system maintaining a constant voltage output, which can be periodically sampled by a feedback module of the system in order to allow a logic control unit of the system to control the output voltage in a timely and precise manner based on the sampling results.

The description presented above is merely that of a few preferred embodiments of the present invention and does not limit the scope thereof in any sense. Any and all changes and modifications made by those of ordinary skill in the art based on the above teachings fall within the scope as defined in the appended claims.

What is claimed is:

1. A switch-mode power supply controller for controlling an output voltage from a switch-mode power supply system, the switch-mode power supply controller comprising an output-voltage power supply unit, a built-in energy storage unit, a high-voltage power supply unit, a power sampling unit and a logic control unit, wherein the built-in energy storage unit and the logic control circuit are integrated in a single package, wherein:

the output-voltage power supply unit has a terminal connected to an output voltage feedback terminal of the switch-mode power supply system and another terminal connected to a power input terminal of the built-in energy storage unit, and the output-voltage power supply unit is configured to charge the built-in energy storage unit using the output voltage from the switch-mode power supply system;

the built-in energy storage unit has a power output terminal connected to an operating voltage terminal of the logic control unit and is configured to provide operating voltage for the logic control unit to operate;

the high-voltage power supply unit has a terminal connected to a bus DC voltage terminal of the switch-mode power supply system, the high-voltage power supply unit has another terminal connected to the power input terminal of the built-in energy storage unit; and the logic control unit is configured to optimize a ratio of lengths of time respectively with the output-voltage power supply unit and the high-voltage power supply unit serving as a power supply based on measurements from the power sampling unit, the power sampling unit is configured to sample a current flowing through a power switch, and the output-voltage power supply unit is configured to charge the built-in energy storage unit under the control of the logic control unit over part or all of a load range for the switch-mode power supply system.

2. The switch-mode power supply controller of claim 1, wherein the output-voltage power supply unit comprises a first electronic switch, the first electronic switch having a control terminal connected to a corresponding output terminal of the logic control unit, the first electronic switch having a path connected to the output voltage feedback terminal of the switch-mode power supply system at one end and to the power input terminal of the built-in energy storage unit at the other end, turning on/off of the path in the first electronic switch is realized according to one charging signal.

3. The switch-mode power supply controller of claim 1, wherein the built-in energy storage unit comprises an energy storage capacitor, wherein the energy storage capacitor is grounded at one end and provides the power input terminal of the built-in energy storage unit at the other end.

4. The switch-mode power supply controller of claim 1, wherein the high-voltage power supply unit is configured to charge the built-in energy storage unit in stages the built-in energy storage unit would be insufficient to provide the operating voltage for the logic control unit.

5. The switch-mode power supply controller of claim 4, wherein the stages in which the built-in energy storage unit would be insufficient to provide the operating voltage for the logic control unit include: a stage before the switch-mode power supply controller is activated and an output from the switch-mode power supply controller is established; and a stage in a discontinuous conduction mode, later than an end time of a demagnetization process and earlier than a start time of a subsequent on/off cycle, and in the stage a voltage on the built-in energy storage unit lower than a predetermined threshold.

6. The switch-mode power supply controller of claim 4, wherein the built-in energy storage unit further comprises a Zener diode and a low-dropout regulator, the Zener diode having a cathode terminal connected to an input terminal of the low-dropout regulator and to the terminal of the built-in energy storage unit where the built-in energy storage unit is connected to the output-voltage power supply unit and the high-voltage power supply unit, the Zener diode having an anode terminal that is grounded, the low-dropout regulator having an output terminal serving as the power output terminal of the built-in energy storage unit and being connected to the operating voltage terminal of the logic control unit, the low-dropout regulator having another input terminal coupled to a first reference voltage, the low-dropout regulator configured to regulate a voltage from the built-in energy storage unit into the operating voltage for the logic control unit according to the first reference voltage.

7. The switch-mode power supply controller of claim 1, wherein the power sampling unit is further configured to feed the sampled current back to the logic control unit, wherein the output-voltage power supply unit is configured to charge the built-in energy storage unit before and/or after the power sampling unit samples the current under the control of the logic control unit.

8. The switch-mode power supply controller of claim 1, further comprising a demagnetization detector, the demagnetization detector configured to detect a demagnetization process in the switch-mode power supply system and feed a detection result back to the logic control unit, wherein the output-voltage power supply unit is configured to charge the built-in energy storage unit during demagnetization under the control of the logic control unit.

9. The switch-mode power supply controller of claim 7, further comprising a disabled time detection unit, the disabled time detection unit connected to both the logic control unit and the power sampling unit, the disabled time detection unit configured to feed back to the logic control unit a disabled time period in which the power sampling unit is allowed to sample a current, wherein the output-voltage power supply unit is configured to charge the built-in energy storage unit within a demagnetization process, when the power sampling unit is not sampling the current and the power switch in the power sampling unit is off-state, under the control of the logic control unit.

10. The switch-mode power supply controller of claim 7, wherein the power sampling unit comprises the power switch, the switch-mode power supply controller further comprising a driver, the driver connected to the logic control unit and a control terminal of the power switch, the driver configured to turn on/off the power switch to control the output voltage from the switch-mode power supply system under the control of the logic control unit, and wherein the output-voltage power supply unit is configured to charge the built-in energy storage unit based on the output voltage.

11. The switch-mode power supply controller of claim 1, further comprising a feedback module, the feedback module having a terminal connected to the output voltage feedback terminal of the switch-mode power supply system, the feedback module having another terminal connected to a corresponding input terminal of the logic control unit, the feedback module configured to sample the output voltage of the switch-mode power supply system and thereby turn on/off the power switch to control the output voltage from the switch-mode power supply system.

12. The switch-mode power supply controller of claim 11, wherein the feedback module comprises a voltage sampling module, a second electronic switch and a comparator, the voltage sampling module having a sampling input terminal connected to the output voltage feedback terminal, the voltage sampling module having a sampling output terminal connected to one end of a path in the second electronic switch, the other end of the path in the second electronic switch connected to an input terminal of the comparator, the second electronic switch having a control terminal connected to a corresponding output terminal of the logic control unit, the comparator having another input terminal coupled to a second reference voltage, the comparator having an output terminal connected to an input compensation terminal of the logic control unit.

13. The switch-mode power supply controller of claim 12, wherein the voltage sampling module comprise two voltage sampling resistors connected in series between the output voltage feedback terminal and a ground, the two voltage sampling resistors connected to each other at a node that provides the sampling output terminal of the voltage sampling module, the two voltage sampling resistors either embedded in the package or standing off the package.

14. A switch-mode power supply system, comprising an AC voltage source, a rectifier connected to the AC voltage source, a bus capacitor connected to the rectifier, a bus DC voltage terminal connected to a common terminal to the bus capacitor and the rectifier and a switch-mode power supply controller, the switch-mode power supply controller comprising an output-voltage power supply unit, a built-in energy storage unit, a high-voltage power supply unit, a power sampling unit and a logic control unit, wherein the built-in energy storage unit and the logic control circuit are integrated in a single package, wherein: the output-voltage power supply unit has a terminal connected to an output voltage feedback terminal of the switch-mode power supply system and another terminal connected to a power input terminal of the built-in energy storage unit, and the output-voltage power supply unit is configured to charge the built-in energy storage unit using the output voltage from the switch-mode power supply system; and the built-in energy storage unit has a power output terminal connected to an operating voltage terminal of the logic control unit and is configured to provide operating voltage for the logic control unit to operate, the switch-mode power supply controller connected between the bus DC voltage terminal and an output voltage terminal of an switch-mode power supply, the high-voltage power supply unit has a terminal connected to the bus DC voltage terminal of the switch-mode power supply system, the high-voltage power supply unit has another terminal connected to the power input terminal of the built-in energy storage unit, and the logic control unit is configured to optimize a ratio of lengths of time respectively with the output-voltage power supply unit and the high-voltage power supply unit serving as a power supply based on measurements from the power sampling unit, the power sampling unit is configured to sample a current flowing through a power switch, and the output-voltage power supply unit is configured to charge the built-in energy storage unit under the control of the logic control unit over part or all of a load range for the switch-mode power supply system.

15. A power supply method for a switch-mode power supply system, comprising:

providing a switch-mode power supply controller comprising a built-in energy storage unit, an output-voltage power supply unit, a high-voltage power supply unit, a power sampling unit and a logic control unit, wherein the built-in energy storage unit and the logic control circuit are integrated in a single package; and powering the built-in energy storage unit using an output voltage from the switch-mode power supply system by the output-voltage power supply unit such that the built-in energy storage unit provides an operating voltage for the switch-mode power supply controller, which ensures normal operation of the switch-mode power supply controller, wherein the logic control unit is configured to optimize a ratio of lengths of time respectively with the output-voltage power supply unit and the high-voltage power supply unit serving as a power supply based on measurements from the power sampling unit, the power sampling unit is configured to sample a current flowing through a power switch, and the output-voltage power supply unit is configured to charge the built-in energy storage unit under the control of the logic control unit over part or all of a load range for the switch-mode power supply system.

16. The power supply method of claim 15, wherein when the switch-mode power supply system operates in a discontinuous conduction mode, the switch-mode power supply controller stays in a standby mode in a period from an end time of the demagnetization process to a start time of a subsequent on/off cycle.

17. The power supply method of claim 15, wherein before the switch-mode power supply controller is activated and an output from the switch-mode power supply controller is established, the built-in energy storage unit is powered by the high-voltage power supply unit and thus provides the operating voltage for the switch-mode power supply controller to accomplish the activation of the switch-mode power supply controller and establishment of the output from the switch-mode power supply controller.

18. The power supply method of claim 17, wherein when the switch-mode power supply system operates in a discontinuous conduction mode, the built-in energy storage unit is powered by the high-voltage power supply unit when the operating voltage provided by the built-in energy storage unit drops below a predetermined threshold within the period from the end time of the demagnetization process to the start time of the subsequent on/off cycle.

19. The power supply method of claim 15, wherein after an output from the switch-mode power supply controller has been established, in the demagnetization process, the built-in energy storage unit is charged by the output-voltage power supply unit before or after a sampling period, or the built-in energy storage unit is charged by the output-voltage power supply unit for different durations respectively preceding and following the sampling period.

* * * * *